(12) United States Patent
Deshpande et al.

(10) Patent No.: US 10,003,620 B2
(45) Date of Patent: Jun. 19, 2018

(54) COLLABORATIVE ANALYTICS WITH EDGE DEVICES

(71) Applicant: International Business Machines Corporation, Armonk, NY (US)

(72) Inventors: Prasad M. Deshpande, Bangalore (IN); Mukesh K. Mohania, New Delhi (IN); Vishal S. Batra, Noida (IN); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 13/927,167

(22) Filed: Jun. 26, 2013

(65) Prior Publication Data

US 2015/0006631 A1     Jan. 1, 2015

(51) Int. Cl.
  *G06F 15/16*     (2006.01)
  *H04L 29/06*     (2006.01)
  *H04L 29/08*     (2006.01)

(52) U.S. Cl.
  CPC .......... *H04L 65/1083* (2013.01); *H04L 67/22* (2013.01); *H04L 67/306* (2013.01)

(58) Field of Classification Search
  CPC . H04L 65/403; H04L 65/4038; H04L 41/142; H04L 12/1822; G06Q 30/0631; H04N 21/482; H04N 21/4532; H04N 21/84; H04N 21/44222; H04N 21/41407
  USPC ................................ 709/221; 725/45, 46, 62
  See application file for complete search history.

(56) References Cited

U.S. PATENT DOCUMENTS

| | | | |
|---|---|---|---|
| 7,899,786 B2 | 3/2011 | Arellano | |
| 8,281,001 B2 | 10/2012 | Busam et al. | |
| 2002/0087887 A1* | 7/2002 | Busam ................... | H04L 63/083 726/3 |
| 2008/0139112 A1* | 6/2008 | Sampath ........... | G06F 17/30867 455/3.04 |
| 2012/0166377 A1* | 6/2012 | Sathish .................. | G06Q 10/00 706/47 |
| 2012/0226764 A1 | 9/2012 | Philip et al. | |

(Continued)

FOREIGN PATENT DOCUMENTS

| | | |
|---|---|---|
| WO | 2012027399 A1 | 3/2012 |
| WO | 2012145443 A2 | 10/2012 |

OTHER PUBLICATIONS

Method to Use Device Data Trends within a Local Environment to Personalize User Searches, IP.com Disclosure No. IPCOM000182366D Publication Date: Apr. 28, 2009.

(Continued)

*Primary Examiner* — Joseph E Avellino
*Assistant Examiner* — Patrick Ngankam
(74) *Attorney, Agent, or Firm* — Ryan, Mason & Lewis, LLP

(57) ABSTRACT

Techniques, systems, and articles of manufacture for collaborative analytics with edge devices. A method includes identifying multiple items of data pertaining to a user from one or more user actions implemented across multiple user devices, identifying one or more rules associated with one or more user preferences, exchanging the multiple items of data across the multiple user devices, and applying the one or more rules to the multiple items of data across the multiple user devices to generate an output via at least one of the multiple user devices.

14 Claims, 5 Drawing Sheets

(56) References Cited

U.S. PATENT DOCUMENTS

| | | | |
|---|---|---|---|
| 2012/0297406 A1* | 11/2012 | Bartholomay | G06Q 30/0241 |
| | | | 725/9 |
| 2012/0323685 A1* | 12/2012 | Ullah | G01S 5/02 |
| | | | 705/14.53 |
| 2013/0171981 A1* | 7/2013 | Woo | G08C 17/02 |
| | | | 455/420 |
| 2014/0098247 A1* | 4/2014 | Rao | H04W 4/20 |
| | | | 348/207.1 |
| 2014/0108019 A1* | 4/2014 | Ehsani | G10L 21/06 |
| | | | 704/275 |
| 2016/0202677 A1* | 7/2016 | Trundle | G08C 19/16 |
| | | | 700/275 |

OTHER PUBLICATIONS

U.S. Appl. No. 13/462,658, filed May 5, 2012, titled Delivering Personalized Recommendations that Relate to Transactions on Display.

* cited by examiner

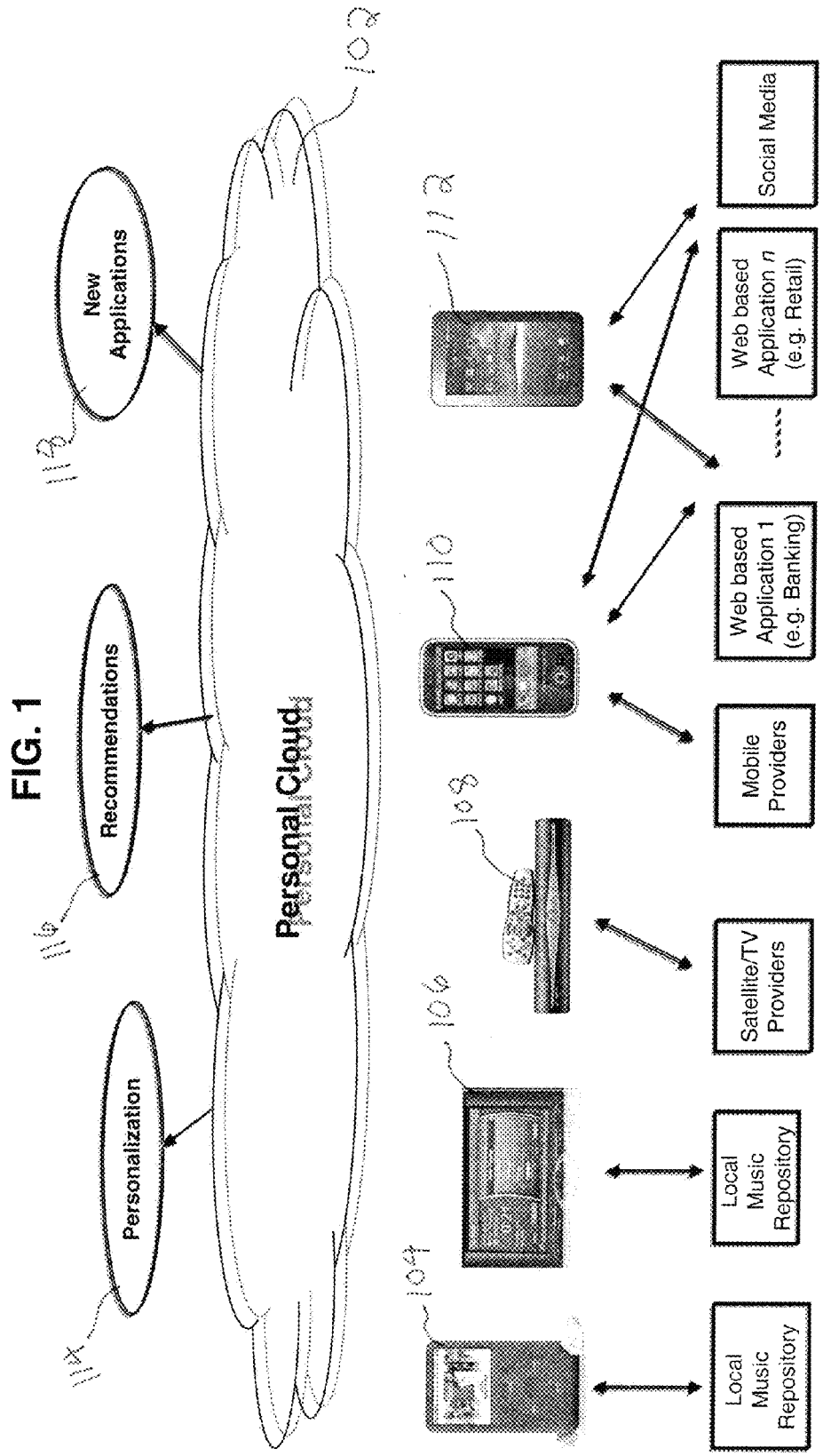

COLLABORATIVE ANALYTICS WITH EDGE DEVICES

FIELD OF THE INVENTION

Embodiments of the invention generally relate to information technology and, more particularly, to device collaboration.

BACKGROUND

Existing analytics approaches for customer targeting, segmentation, etc., are based on analyzing data available at a single enterprise or organization. However, users commonly interact with multiple systems at different enterprises through various devices for different services. For example, a user can use a mobile device for telephone calls and web activity, a set-top box for television, radio and music systems, tablets, laptops, etc. Additionally, such systems can serve as a rich source of data regarding users, user behavior and/or user interactions.

In existing approaches, integrated analytics is not possible at backend servers because such servers may be disconnected systems that cannot communicate with other similar systems. Multiple challenges exist in such approaches in terms of deployment, data access and integration. Accordingly, a need exists for leveraging integrated data across disparate systems to analyze and target customers and/or users.

SUMMARY

In one aspect of the present invention, techniques for collaborative analytics with edge devices are provided. An exemplary computer-implemented method can include the steps of identifying multiple items of data pertaining to a user from one or more user actions implemented across multiple user devices, identifying one or more rules associated with one or more user preferences, exchanging the multiple items of data across the multiple user devices, and applying the one or more rules to the multiple items of data across the multiple user devices to generate an output via at least one of the multiple user devices.

In another aspect of the invention, an exemplary computer-implemented method can include the steps of identifying multiple items of data pertaining to a user from one or more user actions implemented across multiple user devices, identifying one or more rules associated with one or more user preferences, transmitting the multiple items of data to a master device, and applying the one or more rules to the multiple items of data at the master device level to generate an output via at least one of the multiple user devices.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform the noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes collaborative to analytics with edge devices. At least one embodiment of the invention includes creating an integrated view of a user by leveraging data passing through multiple edge devices associated with the user, thereby enabling integrated analytics. Additionally, in at least one embodiment of the invention, multiple devices (for example, devices from different backend applications and systems) can collaborate to integrate data, perform analytics and carry out relevant actions.

As detailed further herein, data pertaining to a user are identified from the user's interactions with various applications at multiple user edge devices. Such devices, by way of example, can include a mobile device, a smart phone, a tablet, a laptop, a television (TV), a music system or application, etc. Also, at least one embodiment of the invention includes integrating such identified data to create a single integrated view of the user, as well as defining one or more rules for personalized recommendations and actions. Such rules can be pre-configured in the system by the vendor, or such rules can be defined by the user (for example, via a rule workbench such as illustrated via component 332 in FIG. 3).

The defined rules can be applied to the integrated view of the user, and one or more actions can be taken based on the given rules. By way of example, such actions can include displaying personalized recommendations and promotions to the user, as well as configuring one or more of the devices to perform some function(s). By way of example, if a user browses for a certain product on his or her mobile device and is subsequently watching television and the same product is advertised, he or she can be provided a personalized offer on the product. This can be achieved by combining the user data from the mobile device and the television device (such as a set-top box).

Another example scenario can include a user visiting a city, wherein the user posts entries on a social media website about his or her visit via his or her mobile device. Additionally, the details of the user's travel bookings are present in the emails maintained on the user's laptop. By combining the travel information with the current location derived from the mobile device, the user can be provided recommendations on places to visit in the city, such as restaurants, hotels, etc. Additional example scenarios are also described herein in connection with one or more aspects of the invention.

Figure 1:
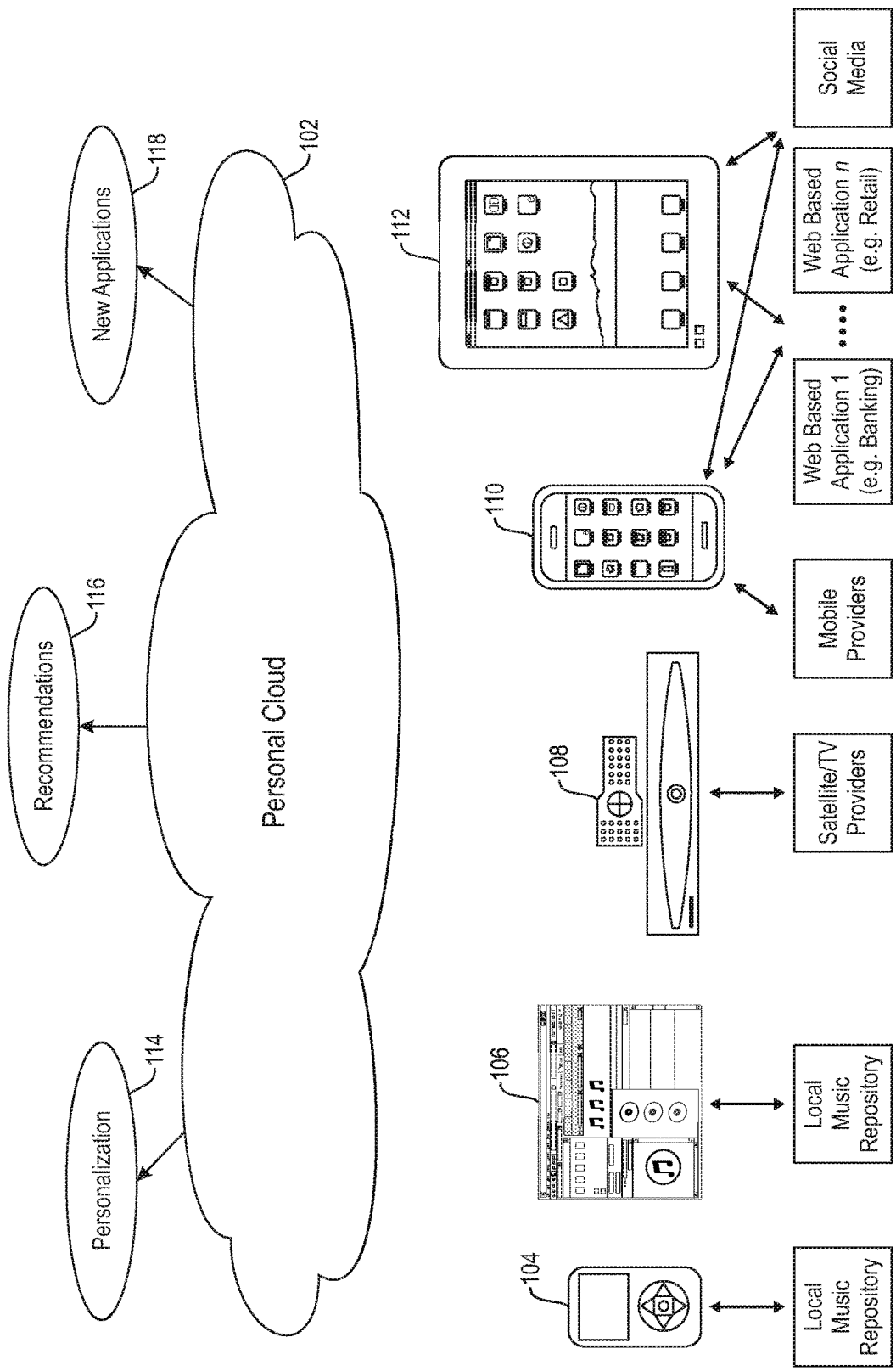
FIG. 1 is a diagram illustrating a system overview, according to an embodiment of the present invention.
Figure 2:
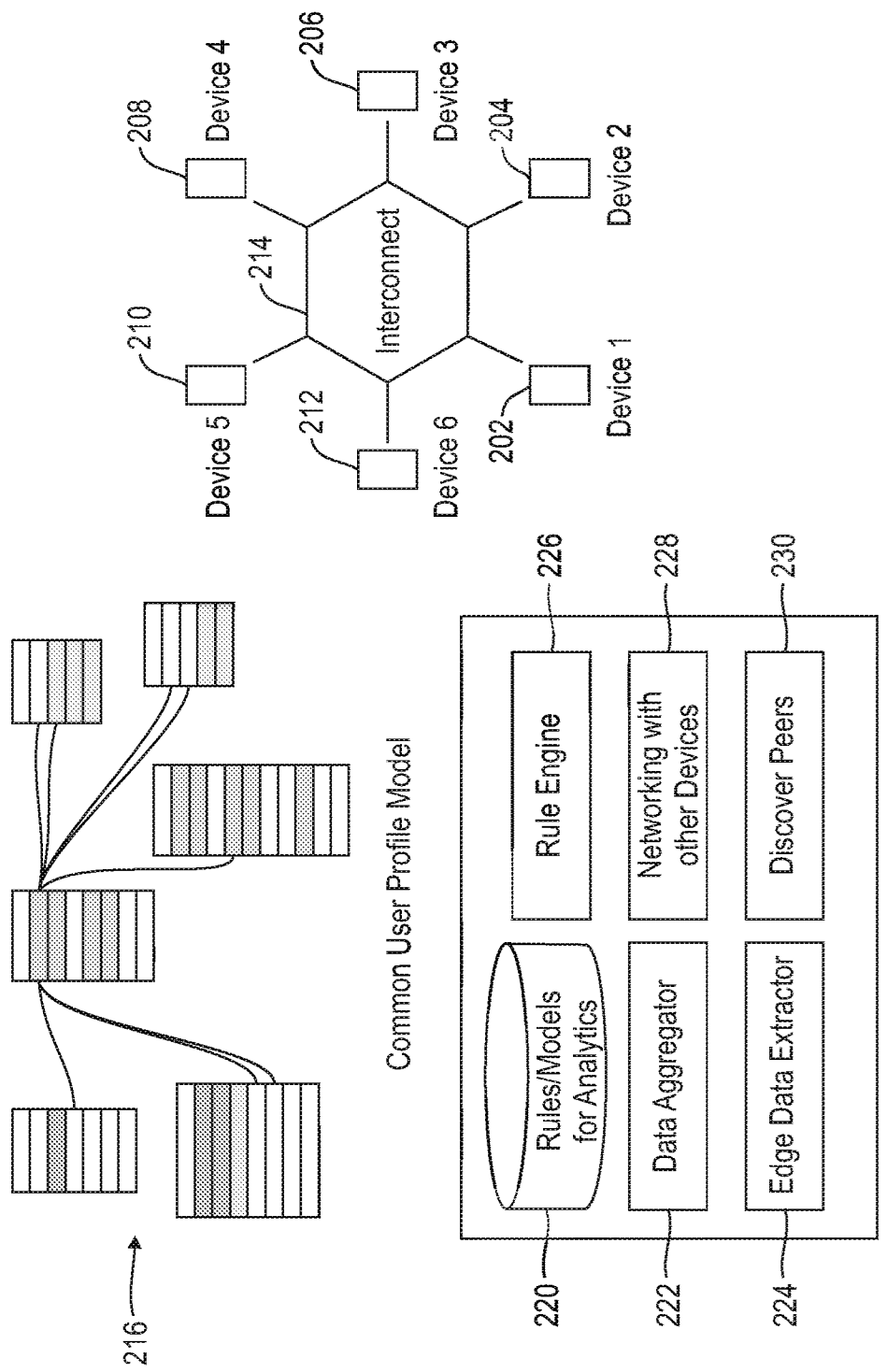
Figure 3:
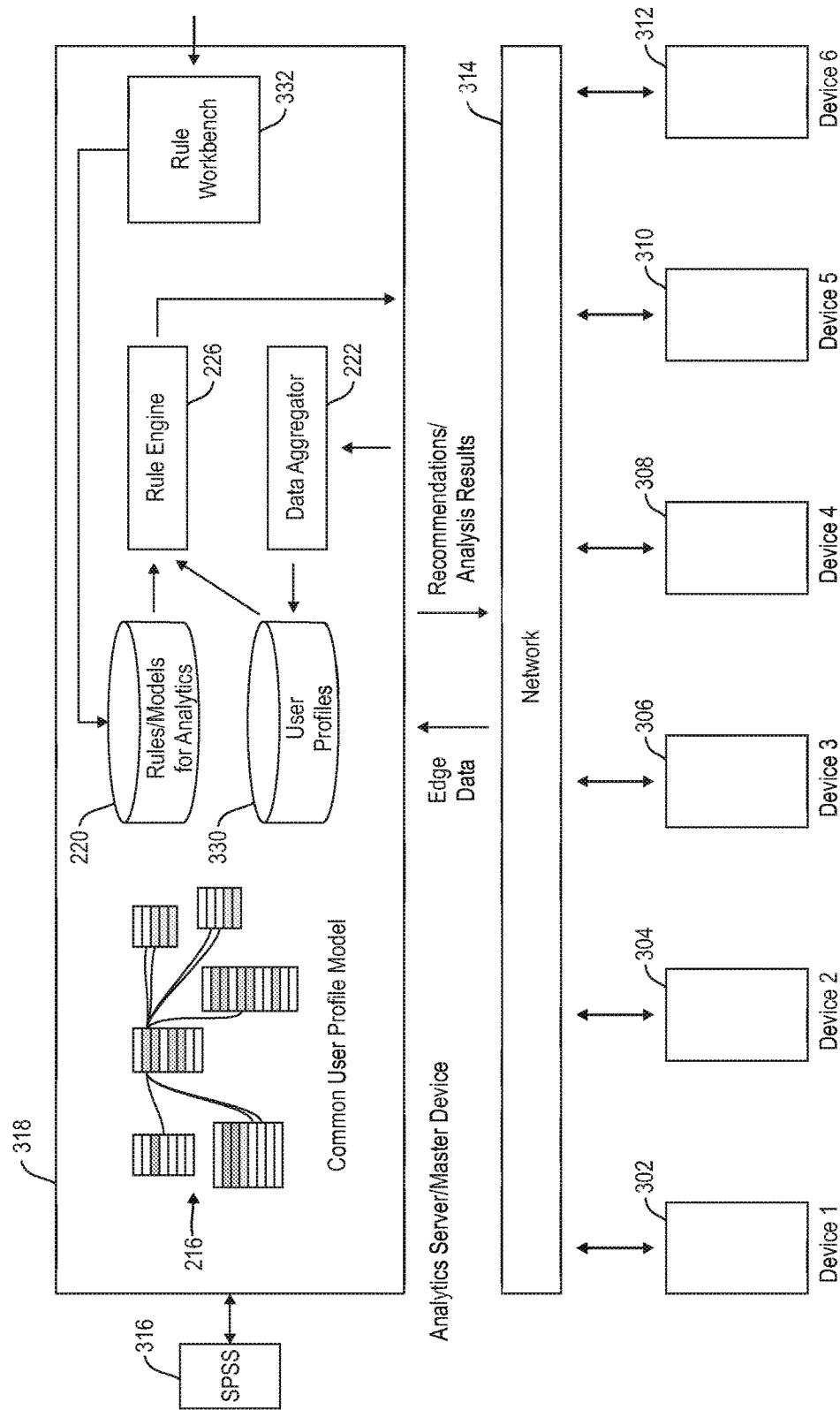
Figure 4:
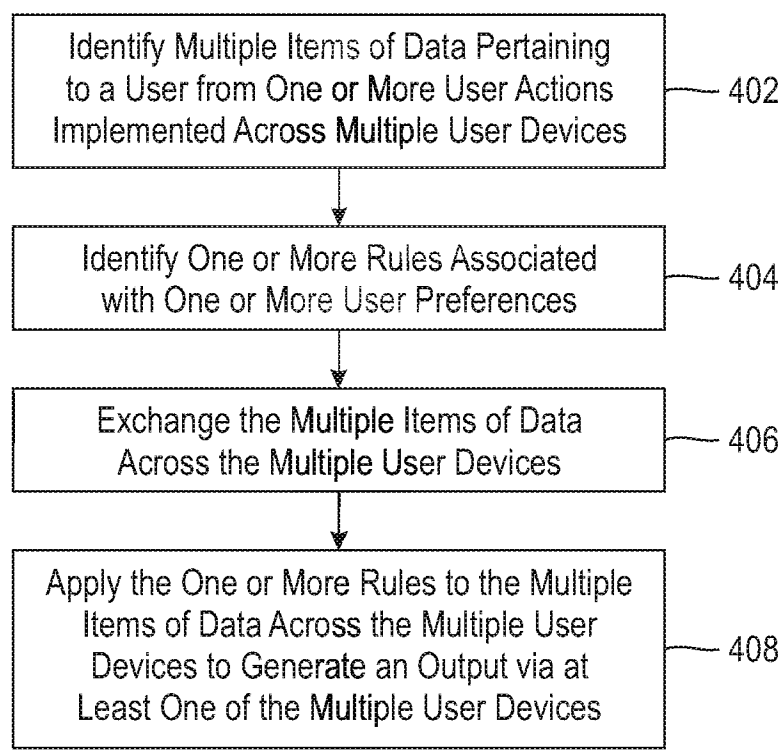
Figure 5:
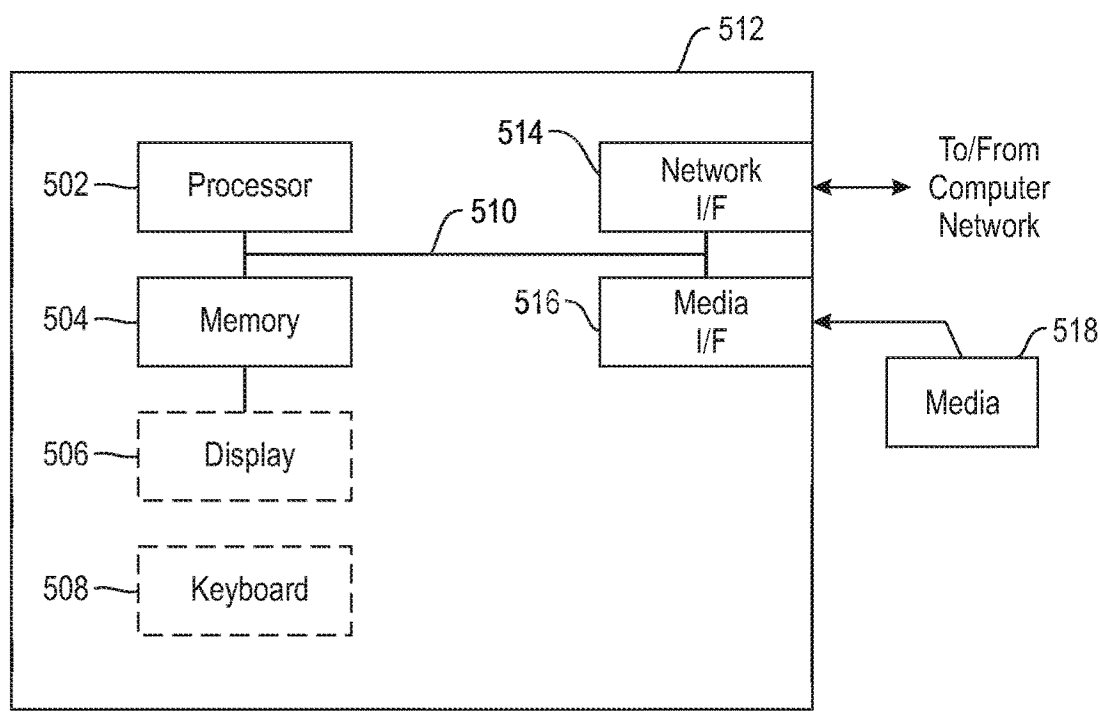

FIG. 1 is a diagram illustrating a system overview, according to an embodiment of the present invention. By way of illustration, FIG. 1 depicts a personal cloud 102 which stores and/or has access to data associated with multiple user devices. Such devices can include a music device 104 and/or car audio player 106, which store a local music repository, a satellite or television device 108, which stores and/or accesses data derived from a satellite or TV provider. Additionally, such devices can include a mobile device such as a smart phone 110 and a tablet 112 or other computer device (such as a laptop or a desktop personal computer). These devices can store and/or access data derived from mobile providers, social media outlets and/or websites, and various web-based applications. As further detailed via component 230 in FIG. 2, at least one embodiment of the invention includes implementing a component that can discover peer devices of a user.

In an example scenario wherein there is a master device (see, for example, FIG. 3), each edge device only needs to know and identify the master device and send its (edge device) information to the master device. The master device information, for example, can be manually configured on the edge devices. In determining which edge devices to use to carry out a particular task, at least one embodiment of the invention includes utilizing the task and the rules corresponding thereto as the basis for such a decision. Such rules can include information pertaining to which items of data to use and on which device to execute the resultant action.

As additionally depicted in FIG. 1, the data from the personal cloud 102 associated with the multiple devices can be integrated, as detailed herein, to generate outputs such as user personalization outputs 114, recommendations 116, and/or new or distinct applications 118.

As further illustrated in connection with FIG. 2 and FIG. 3, at least one embodiment of the invention includes the use of a common user profile model which is used to capture integrated data. In a distributed peer-to-peer setting (see, for example, FIG. 2), the devices exchange data with each other, and each device builds a common user profile based on the data it has collected and applies the rules configured on the device to the integrated data. In a master server setting (see, for example, FIG. 3), all edge devices send data to the master device. The master device integrates the data in the common user profile model and applies the rules configured to the integrated data. In either case, data are integrated as per a common user profile model and rules are subsequently applied thereto. Accordingly, the common user profile model (as further described herein) determines the items data that are to be integrated.

By way merely of example, consider a scenario wherein a user browses one or more web pages on the Internet using his or her smart phone (such as 110 in FIG. 1), and subsequently watches a TV program through his or her cable box or set-top box (such as 108 in FIG. 1). In accordance with an example embodiment of the invention, if there is an advertisement shown during the viewing of the noted TV program that matches an aspect of his or her browsing history, the example embodiment of the invention can include displaying to the user a personalized offer or relevant promotional message.

The offer is generated based on the configured rules. In connection with the above-noted example, the offer is shown on the television, and a corresponding recency of the matching (such as with the mobile device) is also configurable in the rule. For example, a rule might include a statement such as: "If product P appeared in a browsing pattern (keyword search, metadata comparison, etc.) in the last 24 hours, and if P is being displayed on a television device, generate a 5% discount offer and display on the offer on the television device." As noted, the browsing history would be provided by the mobile device and/or laptop to the television device, and the television device would match the browsing history against advertisements being shown on the television device.

Figure 2:
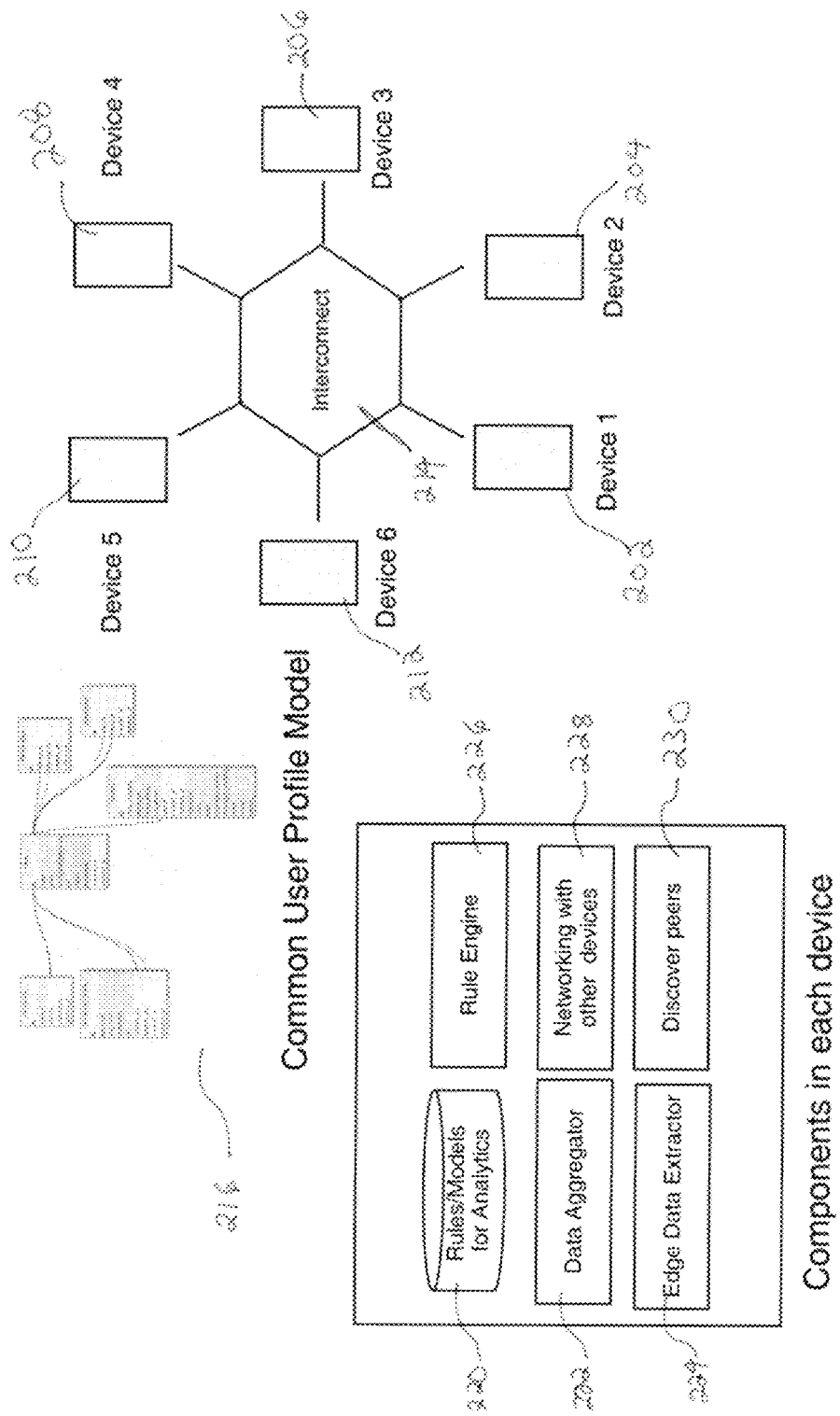
FIG. 2 is a diagram illustrating architecture for a peer device-to-peer device system, according to an embodiment of the present invention.

FIG. 2 is a diagram illustrating architecture for a peer device-to-peer device system, according to an embodiment of the present invention. By way of illustration, FIG. 2 depicts edge devices (such as the example devices detailed herein) 202, 204, 206, 208, 210 and 212, which are each associated with a user, and wherein each of the edge devices is connected to one another via an interconnection component 214. The interconnection component 214 leverages connection capabilities such as Bluetooth, Wi-Fi, etc., and identifies and links the multiple edge devices and enables data transfer therebetween. The common user profile model 216 resident and/or associated with each of the edge devices enables the devices to integrate data from one or more peer devices. Accordingly, each device shares data with and receives data from its peers. Such items of data are collected into a common user profile model on each device and used for matching against one or more rules. For example, the browsing history in the user profile can be derived from a mobile device or a laptop, the television viewing pattern can be derived from the television device, music listening patterns and/or preferences can be derived from the music devices, etc.

As also depicted in FIG. 2 (and additionally described in connection with FIG. 3), each edge device includes components including a database 220 for rules and/or models for analytics, a data aggregator component 222, an edge data extractor component 224, a rule engine 226, a networking component 228 and a peer device discovery component 230.

The edge extractor component 224 extracts data from edge applications on each given device. For example, as noted above, browsing history can be extracted from the web browser on a given device. Similarly, calendar information is extracted from a calendar application, etc. The data aggregator component 222 aggregates data from each given device and the data received from the peer devices and populates the common user profile. The database 220 of rules is a repository of rules either pre-configured or configured by the user that are applied to the integrated user profile. Accordingly, the rule engine 226 applies the rules in the repository 220 to the integrated data in the user profile.

Additionally, the networking component 228 provides a means of communicating with and between peer devices, using one or more standard protocols such as Bluetooth, Wi-Fi, near field communication (NFC), etc. Also, the peer discovery component 230 discovers peer devices that are within a range of communication. This can be accomplished, for example, via sending out probe messages to which any device within range can respond indicating that it is available for sharing data.

By way merely of example, consider a scenario wherein a correlation of events across multiple devices and/or systems is detected. For instance, assume that a user arrives at a Bangalore airport and posts an entry via a social media application on his or her smart phone that states, "First trip to Bangalore, looking to visit the beautiful city." Additionally, assume that this user opens his or her email via a laptop or tablet to access hotel reservation details, local weather, etc. Accordingly, at least one embodiment of the invention can include providing the user with one or more relevant recommendations (for example, tourist security, local and nearby weather forecasts/conditions, local tourism offers, local transportation options, local restaurants options, etc.) based on these noted inputs. Such an example embodiment of the invention includes collaborating and/or integrating data from multiple devices (the user's smart phone, laptop, tablet, etc.) utilizing edge data such as cell tower location, social media entries, hotel reservation details, calendar information, weather information, etc.

In accordance with an example embodiment of the invention, using various items of edge data to generate a recommendation can be carried out via a rule that consults a recommendation service on the web. In the above example, the calendar data and the social media entry data are used to determine that the user is travelling. Also, the mobile data are used to determine an exact location of the user (through global positioning system (GPS) coordinates or cell tower-based positioning). This information can be provided to an internet search service to generate recommendations of restaurants, cab services, places to see, etc. based on the user's current location.

Figure 3:
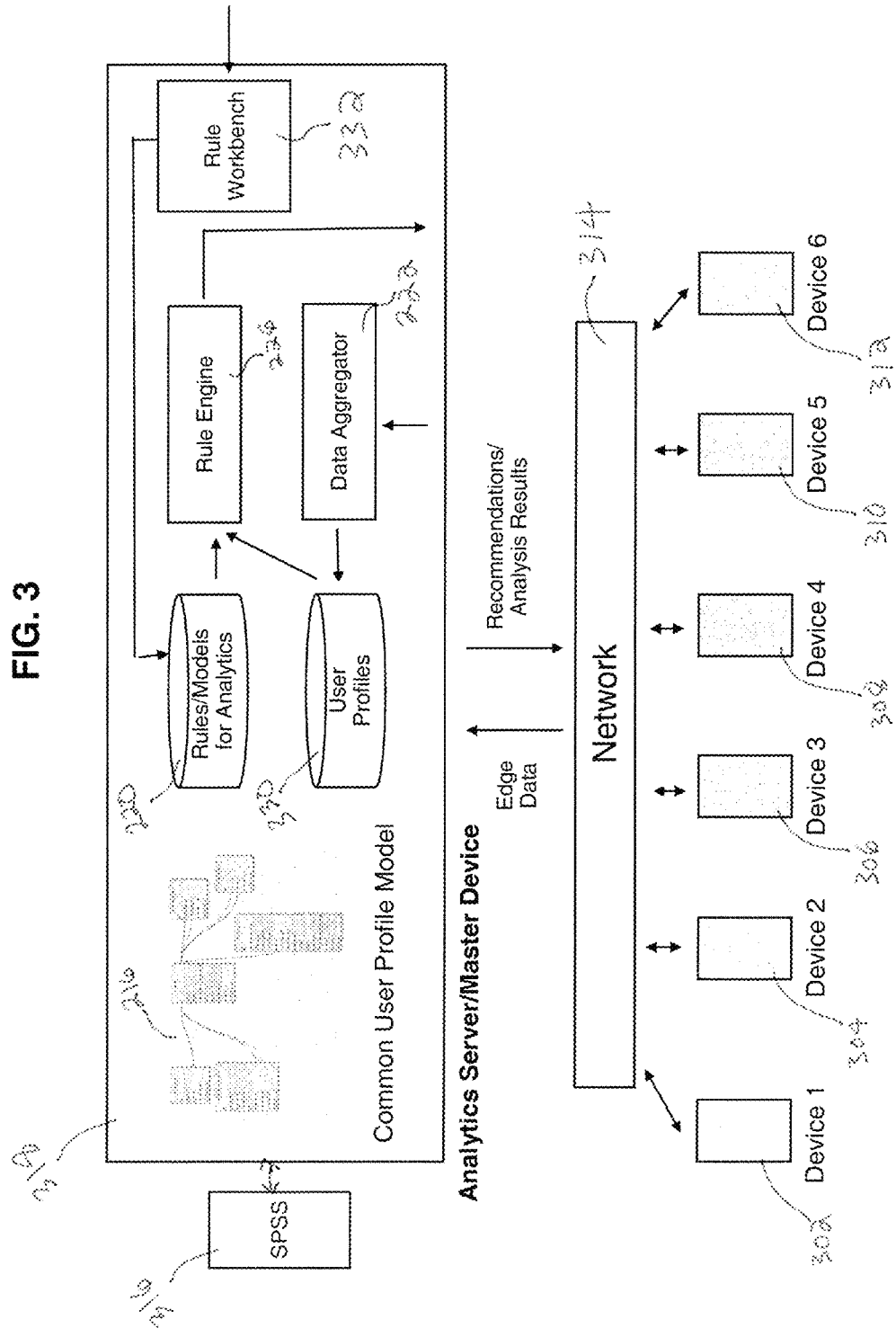
FIG. 3 is a diagram illustrating architecture for a system containing a common server or master device, according to an embodiment of the present invention.

FIG. 3 is a diagram illustrating architecture for a system containing a common server or master device, according to an embodiment of the present invention. By way of illustration, FIG. 3 depicts edge devices (such as the example devices detailed herein) 302, 304, 306, 308, 310 and 312, which are each associated with a user, and wherein each of the edge devices connects to a common network 314. Also connecting to and interacting with the network 314 is an analytics server and/or master device 318, which additionally interacts with a statistical analysis component 316 (such as, for example, a statistical product and service solutions (SPSS) component). As noted via FIG. 3, the network 314 (via the devices) provides edge data to the analytics server and/or master device 318, which returns one or more recommendations and/or analysis results to the network 314 (to subsequently be forwarded to one or more of the devices) based on the provided edge data.

As also depicted in FIG. 3, the analytics server and/or master device 318 includes common user profile model 216, the database 220 for rules and/or models for analytics, a database 330 of user profiles, rule engine 226, data aggregator component 222 and a rule workbench component 332.

The rule workbench component 332 is used to configure the rules that are stored in the database of rules 220. Additionally, the edge data coming from various devices first flow into the data aggregator 222. The data aggregator aggregates the data according to the common model 216 and populates the user profiles 330. The rule engine applies the rules from database 220 to the integrated user profile data 330, and generates the results (for example, actions and/or recommendations). These results are then communicated to the relevant edge device.

At least one embodiment of the invention includes pre-processing steps that include configuring one or more rules using the rule workbench component 332 or learning analytical models using the statistical analysis component 316. Also, pre-processing steps can additionally include discovering the edge devices associated with a given user.

With respect to configuring rules, the rule workbench component 332 allows for defining rules using a rule language. For example, as noted above, a rule can include a statement such as: "If product P appeared in a browsing pattern (a keyword search or a metadata comparison, for example,) in the previous 24 hours, and if P is being displayed on the television device, generate a 5% discount offer and display the offer on the television device." Additionally, user behavior patterns can be learned from historical data. For example, based on user data pertaining to television programs watched on a user's devices, a pattern can be determined pertaining to which programs are watched regularly by the user. Such learned patterns can subsequently be recorded and/or stored as desired or needed.

Further, in accordance with at least one embodiment of the invention, during run-time, the identified edge devices collect information pertaining to the user through various interactions of the user with various applications/systems (such as described, for example, above in connection with FIG. 1). As noted, this collected information is sent to a peer device, a master device, and/or an analytics server. Accordingly, data collected from multiple devices are integrated into a common user model (such as model 216 in FIG. 2 and FIG. 3). Pre-defined rules and/or models (for example, such as stored in database 220) are applied to the integrated data to generate one or more recommendations and/or proposed actions. Such recommendations and/or actions are transmitted to one or more relevant devices to be displayed or otherwise communicated to the user. As noted herein, the determination as to which of the edge devices receives this communication is based on the particular rules configured in accordance with a given embodiment of the invention.

By way merely of example, consider a scenario wherein devices collaborate to achieve a task. For instance, assume that a user is travelling for a scheduled meeting. A smart phone associated with the user detects this based on calendar information contained therein and informs a set-top box associated with the user to record a TV program that the user regularly watches during the period of time that overlaps with the scheduled meeting. Additionally, a smart home control system is informed to switch-off unnecessary lights, fans, etc. during the period of time coinciding with the scheduled meeting. The execution of such a communication can depend on the configuration of the given system. For example, in a peer-to-peer setting (such as, for example, FIG. 2) the smart phone can directly send the communication to the set top box or the home control system. In a master device scenario (such as, for example, FIG. 3), the communication can be sent to the master device, which will further send the communication to the set top box or home control system.

Figure 4:
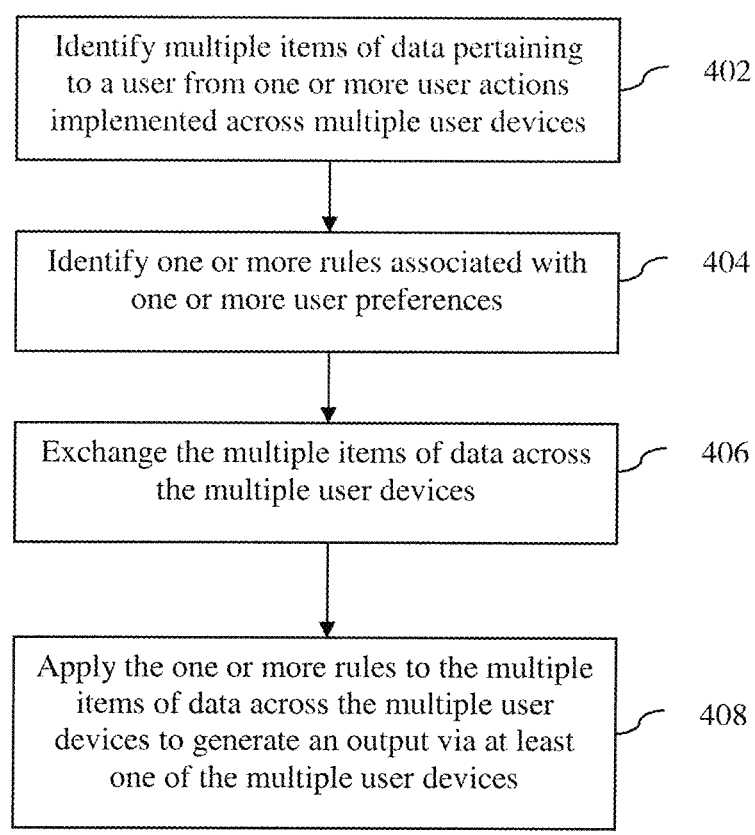
FIG. 4 is a flow diagram illustrating techniques according to an embodiment of the invention.

FIG. 4 is a flow diagram illustrating techniques according to an embodiment of the invention. Step 402 includes identifying multiple items of data pertaining to a user from one or more user actions implemented across multiple user devices. The user devices can include, for example, a mobile device, a smart phone, a tablet, a smart home system, a laptop, a television service component and/or a music system.

Step 404 includes identifying one or more rules associated with one or more user preferences. Such rules can include, for example, one or more rules pertaining to generating an output in accordance with user preferences. Identifying such rules can include, for example, learning one or more rules via applying a statistical analysis technique to user data. Step 406 includes exchanging the multiple items of data across the multiple user devices. Exchanging the items of data across the user devices includes facilitating communication across the multiple user devices via a network medium.

Step 408 includes applying the one or more rules to the multiple items of data across the multiple user devices to generate an output via at least one of the multiple user devices. The output can include, for example, a personalized recommendation for the user, and/or execution of a pre-defined action on the at least one user device.

The techniques depicted in FIG. 4 can also include integrating the multiple items of data to create a model of user behavior based on the multiple items of data identified from the one or more user actions implemented across the multiple user devices. Further, at least one embodiment of the invention includes identifying the multiple user devices.

At least one embodiment of the invention can alternatively include identifying multiple items of data pertaining to a user from one or more user actions implemented across multiple user devices, identifying one or more rules associated with one or more user preferences, transmitting the multiple items of data to a master device, and applying the rules to the multiple items of data at the master device level to generate an output via at least one of the multiple user devices. Such an embodiment can include, as detailed herein, facilitating communication via a network.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 5:
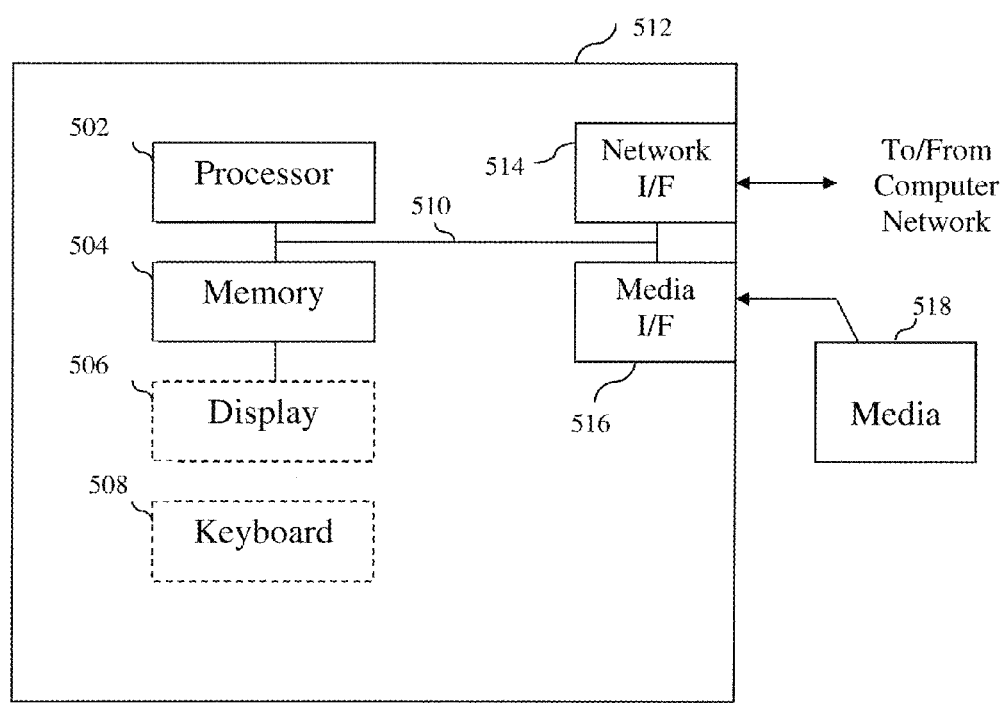
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, enabling edge device collaboration for in furtherance of analytics and/or additional actions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying multiple items of data pertaining to (a) a user and (b) a given temporal duration from one or more user actions implemented across at least one of multiple devices associated with the user, wherein said multiple devices comprise (i) at least one mobile device, (ii) at least one smart home system, and (iii) at least one television service component, and wherein said identifying the multiple items of data is carried out by a server communicatively linked to each respective one of the multiple devices associated with the user;
   identifying one or more rules associated with one or more user preferences, wherein the one or more rules are identified from a database comprising (i) a collection of multiple pre-configured rules pertaining to the multiple devices and (ii) a collection of multiple user-configured rules, and wherein said identifying the one or more rules is carried out by the server;
   exchanging the multiple items of data across each respective one of the multiple devices associated with the user, wherein said exchanging is carried out by the server communicatively linked to each respective one of the multiple devices associated with the user;
   applying the one or more rules to the multiple items of data across each respective one of the multiple devices associated with the user, wherein said applying is carried out by the server, and wherein said applying comprises applying a rule stating that if a given product appeared in a web browsing pattern of the at least one mobile device within a pre-defined window of time, and if the given product is being displayed on the at least one television service component, a pre-defined percentage discount offer for the given product is to be generated for the user and display on the at least one television service component; and
   generating an output via each of the multiple devices associated with the user based on said applying, wherein said outputs comprise (i) an instruction to the at least one television service component to record content during the given temporal duration, (ii) an instruction to the at least one smart home system to power-on one or more appliances during the given temporal duration, (iii) an instruction to the at least one smart home system to power-off one or more appliances during the given temporal duration, and (iv) an instruction to the at least one television service component to display at least one discount offer for at least one product for the user based on one of the identified items of data derived from one or more user web browsing patterns implemented via the at least one mobile device, and wherein said generating comprises transmitting, from the server, instructions to the respective devices.

2. The method of claim 1, comprising:
   identifying the multiple devices associated with the user.

3. The method of claim 1, comprising:
   integrating the multiple items of data to create a model of user behavior.

4. The method of claim 3, wherein creating a model of user behavior comprises creating a model based on the multiple items of data identified from the one or more user actions implemented across the multiple devices associated with the user.

5. The method of claim 1, wherein said one or more rules comprises one or more rules pertaining to generating the output in accordance with the one or more user preferences.

6. The method of claim 1, wherein said exchanging comprises facilitating communication across the multiple user devices via a network medium.

7. An article of manufacture comprising a non-transitory computer readable storage medium having computer readable instructions tangibly embodied thereon which, when implemented, cause a computer to carry out a plurality of method steps comprising:
   identifying multiple items of data pertaining to (a) a user and (b) a given temporal duration from one or more user actions implemented across at least one of multiple devices associated with the user, wherein said multiple devices comprise (i) at least one mobile device, (ii) at least one smart home system, and (iii) at least one television service component, and wherein said identifying the multiple items of data is carried out by a server communicatively linked to each respective one of the multiple devices associated with the user;
   identifying one or more rules associated with one or more user preferences, wherein the one or more rules are identified from a database comprising (i) a collection of multiple pre-configured rules pertaining to the multiple devices and (ii) a collection of multiple user-configured rules, and wherein said identifying the one or more rules is carried out by the server;
   exchanging the multiple items of data across each respective one of the multiple devices associated with the user, wherein said exchanging is carried out by the server communicatively linked to each respective one of the multiple devices associated with the user;
   applying the one or more rules to the multiple items of data across each respective one of the multiple devices associated with the user, wherein said applying is carried out by the server, and wherein said applying comprises applying a rule stating that if a given product appeared in a web browsing pattern of the at least one mobile device within a pre-defined window of time, and if the given product is being displayed on the at least one television service component, a pre-defined percentage discount offer for the given product is to be generated for the user and display on the at least one television service component; and generating an output via each of the multiple devices associated with the user based on said applying, wherein said outputs comprise (i) an instruction to the at least one television service component to record content during the given temporal duration, (ii) an instruction to the at least one smart home system to power-on one or more appliances during the given temporal duration, (iii) an instruction to the at least one smart home system to power-off one or more appliances during the given temporal duration, and (iv) an instruction to the at least one television service component to display at least one discount offer for at least one product for the user based on one of the identified items of data derived from one or more user web browsing patterns implemented via the at least one mobile device, and wherein said generating comprises transmitting, from the server, instructions to the respective devices.

8. A system comprising:

a memory; and at least one processor coupled to the memory and configured for:

identifying multiple items of data pertaining to (a) a user and (b) a given temporal duration from one or more user actions implemented across at least one of multiple devices associated with the user, wherein said multiple devices comprise (i) at least one mobile device, (ii) at least one smart home system, and (iii) at least one television service component, and wherein said identifying the multiple items of data is carried out by a server communicatively linked to each respective one of the multiple devices associated with the user;

identifying one or more rules associated with one or more user preferences, wherein the one or more rules are identified from a database comprising (i) a collection of multiple pre-configured rules pertaining to the multiple devices and (ii) a collection of multiple user-configured rules, and wherein said identifying the one or more rules is carried out by the server;

exchanging the multiple items of data across each respective one of the multiple devices associated with the user, wherein said exchanging is carried out by the server communicatively linked to each respective one of the multiple devices associated with the user;

applying the one or more rules to the multiple items of data across each respective one of the multiple devices associated with the user, wherein said applying is carried out by the server, and wherein said applying comprises applying a rule stating that if a given product appeared in a web browsing pattern of the at least one mobile device within a pre-defined window of time, and if the given product is being displayed on the at least one television service component, a pre-defined percentage discount offer for the given product is to be generated for the user and display on the at least one television service component; and generating an output via each of the multiple devices associated with the user based on said applying, wherein said outputs comprise (i) an instruction to the at least one television service component to record content during the given temporal duration, (ii) an instruction to the at least one smart home system to power-on one or more appliances during the given temporal duration, (iii) an instruction to the at least one smart home system to power-off one or more appliances during the given temporal duration, and (iv) an instruction to the at least one television service component to display at least one discount offer for at least one product for the user based on one of the identified items of data derived from one or more user web browsing patterns implemented via the at least one mobile device, and wherein said generating comprises transmitting, from the server, instructions to the respective devices.

9. A method comprising:

identifying multiple items of data pertaining to (a) a user and (b) a given temporal duration from one or more user actions implemented across at least one of multiple devices associated with the user, wherein said multiple devices comprise (i) at least one mobile device, (ii) at least one smart home system, and (iii) at least one television service component, and wherein said identifying the multiple items of data is carried out by a master computing device communicatively linked to each respective one of the multiple devices associated with the user;

identifying one or more rules associated with one or more user preferences, wherein the one or more rules are identified from a database comprising (i) a collection of multiple pre-configured rules pertaining to the multiple devices and (ii) a collection of multiple user-configured rules, and wherein said identifying the one or more rules is carried out by the master computing device;

transmitting the multiple items of data to the master computing device;

applying the one or more rules to the multiple items of data at the master computing device level, wherein said applying comprises applying a rule stating that if a given product appeared in a web browsing pattern of the at least one mobile device within a pre-defined window of time, and if the given product is being displayed on the at least one television service component, a pre-defined percentage discount offer for the given product is to be generated for the user and display on the at least one television service component; and generating an output via each of the multiple devices associated with the user based on said applying, wherein said outputs comprise (i) an instruction to the at least one television service component to record content during the given temporal duration, (ii) an instruction to the at least one smart home system to power-on one or more appliances during the given temporal duration, (iii) an instruction to the at least one smart home system to power-off one or more appliances during the given temporal duration, and (iv) an instruction to the at least one television service component to display at least one discount offer for at least one product for the user based on one of the identified items of data derived from one or more user web browsing patterns implemented via the at least one mobile device, and wherein said generating comprises transmitting, from the master computing device, instructions to the respective devices.

10. The method of claim 9, comprising:

integrating the multiple items of data to create a model of user behavior.

11. The method of claim 10, wherein creating a model of user behavior comprises creating a model based on the multiple items of data identified from the one or more user actions implemented across the multiple devices associated with the user.

12. The method of claim 9, wherein said one or more rules comprises one or more rules pertaining to generating the output in accordance with the one or more user preferences.

13. The method of claim 9, wherein said identifying one or more rules further comprises learning one or more rules via applying a statistical analysis technique to user data.

14. The method of claim 9, wherein said transmitting comprises facilitating communication via a network.

\* \* \* \* \*

UNITED STATES PATENT AND TRADEMARK OFFICE
CERTIFICATE OF CORRECTION

PATENT NO. : 10,003,620 B2
APPLICATION NO. : 13/927167
DATED : June 19, 2018
INVENTOR(S) : Deshpande et al.

It is certified that error appears in the above-identified patent and that said Letters Patent is hereby corrected as shown below:

In the Drawings

Replace Drawing Sheets 1 through 5 with the attached drawing sheets 1 through 5.

Signed and Sealed this
Ninth Day of July, 2019

Andrei Iancu
*Director of the United States Patent and Trademark Office*